Jan. 21, 1958  E. A. NEUGASS  2,820,885
INSTRUMENT ILLUMINATING MEANS
Filed Jan. 25, 1954  2 Sheets-Sheet 1

INVENTOR.
EDWIN A. NEUGASS.
BY
ATTORNEY.

Jan. 21, 1958     E. A. NEUGASS     2,820,885
INSTRUMENT ILLUMINATING MEANS
Filed Jan. 25, 1954     2 Sheets—Sheet 2
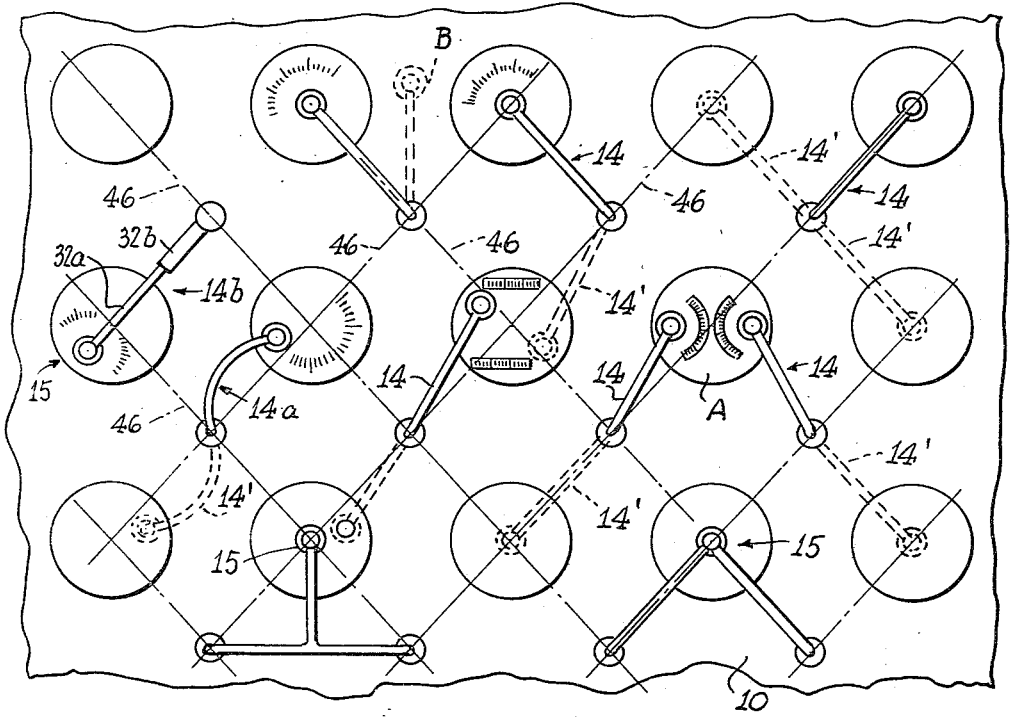
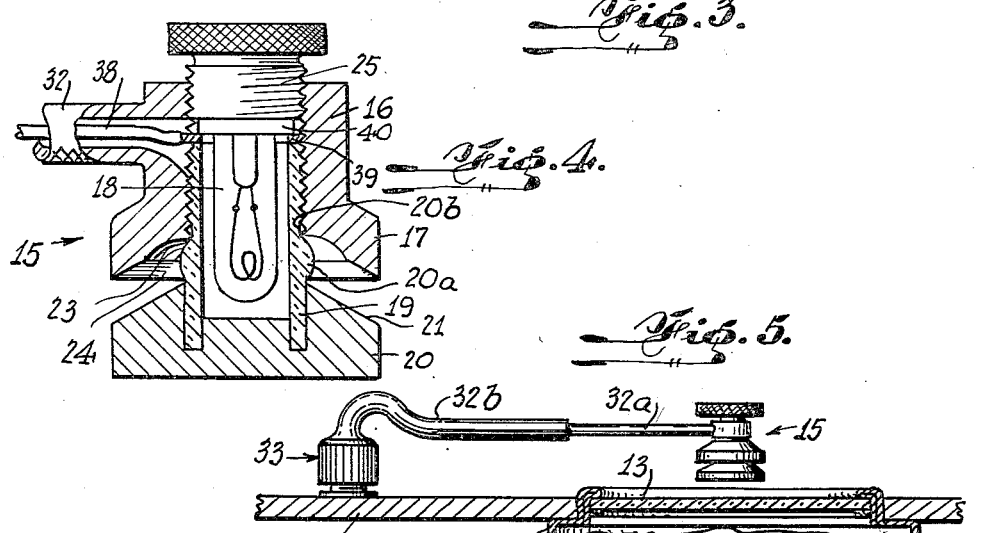
INVENTOR.
EDWIN A. NEUGASS.
BY
ATTORNEY.

United States Patent Office 2,820,885
Patented Jan. 21, 1958

2,820,885
INSTRUMENT ILLUMINATING MEANS
Edwin A. Neugass, Poteau, Okla.

Application January 25, 1954, Serial No. 406,017

8 Claims. (Cl. 240—8.16)

The present invention relates generally to instrument illuminating means, and is particularly directed to means for illuminating the faces and indicating needles or pointers of instruments of the kind found on automobile and airplane dashboards or instrument panels, in chemical plant installations and the like.

An object of the present invention is to provide means for illuminating such instruments wherein light is directed only against the instrument face and indicating needle in the direction away from the viewer while avoiding the escape or reflection of light in any direction that might confuse, or interfere with, reading of the indication provided by the instrument.

Another object is to provide means of illuminating instruments of the described character which are contained in sealed cases, and wherein illumination is effected from a source outside of the sealed cases and may be employed without in any way altering the instruments or their cases so that illuminating means embodying the present invention may be added to existing instrument installations or made a part of new instrument assemblies.

Still another object is to provide instrument illuminating means affording the viewer the opportunity of widely varying the intensity and location of the illumination thereby satisfying the personal preferences of the viewer or the demands of changing circumstances.

A further object is to provide instrument illuminating means of the described character which is supported in front of the instrument face in a manner avoiding interference with the viewing of any important portions of the scales or calibrations on the face being illuminated.

In accordance with the present invention, an instrument mounted in back of a protective glass is illuminated by a light source disposed in front of the instrument between the latter and the viewer with the light source being contained in a housing having an annular slit in the side wall thereof to direct an annular cone of light against the important portions of the instrument face. Preferably, the base angle of the annular cone of light emitted from the housing is relatively small so that any light reflected from the protective glass or the instrument face is directed toward the side rather than back in the direction toward the viewer and glare interfering with viewing of the illuminated portions of the instrument face is thereby avoided. Further, the housing for the light source is supported in front of a relatively unimportant portion of the instrument face and is positionally adjustable with respect to the instrument face so that the viewer can direct the emitted light against any particular part of the face as may be desired.

An important feature of an instrument illuminating assembly embodying the present invention resides in the arrangement for supporting the light source containing housing in front of the related instrument face, and this supporting arrangement preferably includes a relatively thin support arm which carries the housing at one end and is mounted at its other end on the panel adjacent the related instrument or on the flange of the instrument case, with the support arm being swingable, deformable or extensible in order to permit adjustment of the housing for the light with respect to the instrument face. Preferably, instruments on a panel illuminated in accordance with this invention are arranged in horizontally and vertically aligned rows, and the slender support arms carrying the housings for the light sources are swingably mounted at the intersections of diagonal lines passing through the centers of the adjacent instrument faces so that each light source containing housing can be positionally adjusted to illuminate a selected portion of any of the adjacent instrument faces.

The above, and other objects, features and advantages of the invention will be manifest in the following detailed description of illustrative embodiments thereof, particularly when the description is read in connection with the accompanying drawings forming a part hereof, and wherein:

Fig. 3 is a front elevational view of a portion of an instrument panel having illuminating devices thereon constructed in accordance with several different embodiments of the invention;

Fig. 4 is a detail sectional view of a portion of Fig. 1 shown on an enlarged scale; and Fig. 5 is an elevational view of another embodiment of the invention.

Figure 2:
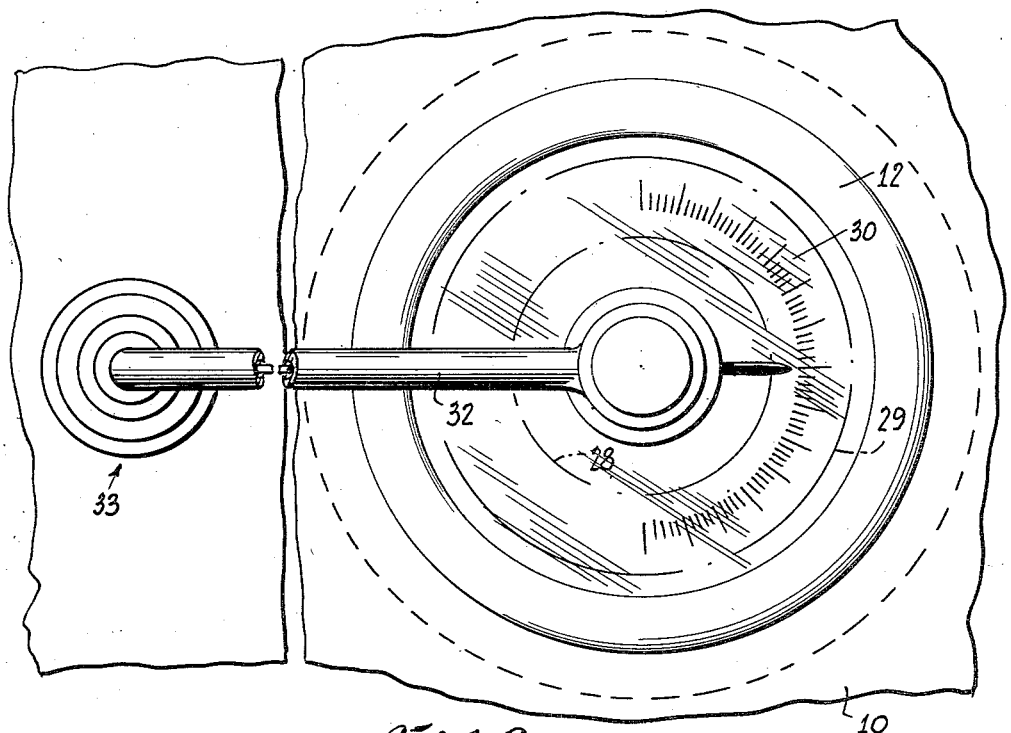
Fig. 2 is a front elevational view of the illuminating device of Fig. 1.
Figure 1:
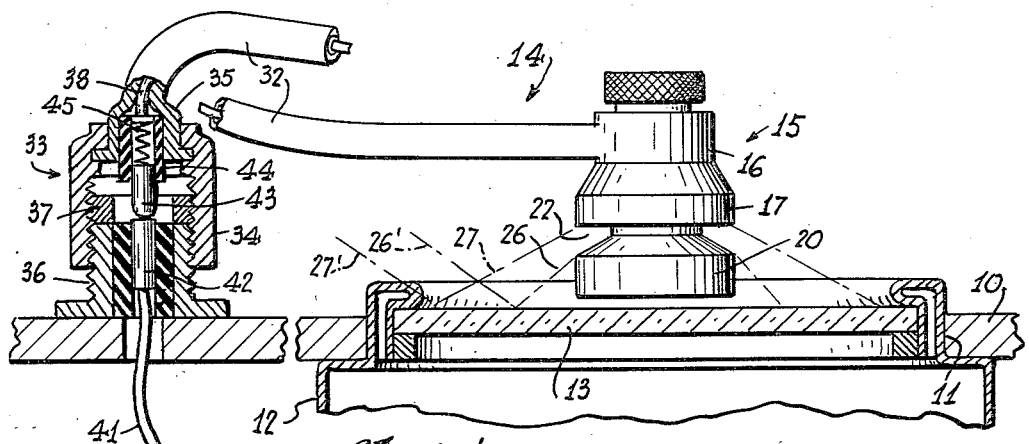
Fig. 1 is an elevational view, partly broken away and in section, of an illuminating device embodying the present invention and shown mounted on an instrument panel for illuminating a related instrument.

Referring to the drawings in detail, and initially to Figs. 1, 2 and 4 thereof, an instrument panel 10 (Figs. 1 and 2) is shown formed with an opening 11 therein exposing the front or face portion of an instrument casing 12 which is mounted behind the panel and includes a protective glass 13 covering the instrument face.

A device embodying the present invention for illuminating the face of the instrument 12 from a location in front of the panel 10 is illustrated in Figs. 1, 2 and 4 and there generally identified by the reference numeral 14. The illuminating device 14 includes an illuminating head generally identified by the reference numeral 15 which is adapted to be supported, preferably in the manner hereinafter described in detail, at a location in front of an unimportant part or section of the face to be illuminated so that the head 15 is disposed between the viewer and the instrument face and directs illuminating rays of light against the portions of the instrument face to be viewed, for example, the indicating pointer and the scale with which it cooperates. The illuminating head 15 includes a sleeve 16 formed with an outwardly flaring portion 17 at the end facing toward the panel 10. As seen in Fig. 4, the sleeve 16 is internally threaded to receive the base of a light bulb 18, which is threaded into the sleeve 16 from the end of the latter facing away from the panel 10, and an externally threaded transparent cylinder 19, which may be colored or tinted, extends into the threaded sleeve around the glass envelope of light bulb 18. A base 20 is fitted onto transparent cylinder 19 and is formed with a conical surface 21 at the end thereof facing toward the flared end portion 17 of the sleeve. The numeral 20a indicates a lens, the shank of which has a straight portion 20b.

As seen in Fig. 4, an annular slit 22 is defined between the confronting end surfaces of the end portion 17 and the base 20, with the annular slit 22 being inclined in the direction toward the panel for emitting an annular cone of light directed toward the instrument face in front of which the head 15 is positioned. The inner surface of the flared end portion 17 of sleeve 16 is formed with a concave annular portion 23 (Fig. 4) which is highly polished and reflects the light rays impinging thereagainst in the direction toward the instrument face, and the remainder 24 of the inner surface of flared end portion 17 and surface 21 of base 20 have non-reflecting coatings thereon, for example, matte finish black paint, to avoid reflection of the emitted light in the direction toward the viewer. A similar non-reflecting coating is applied to all of the external surfaces of the illuminating device 14.

The width and diameter of the annular area of the instrument face illuminated by head 15 can be varied by increasing or decreasing the size of annular slot 22, and adjustment of the slot size is achieved by screwing in and out of transparent cylinder 19 to decrease and increase, respectively, the axial distance between the surfaces 21 and 24. It is to be understood that the base 25 of light bulb 18 is correspondingly screwed in and out relative to sleeve 16 to permit the movement of cylinder 19 necessary for adjustment of the slot size.

As seen in Figs. 1 and 2, the annular cone of light emitted from slot 22 has relatively small base angles at both its inner and outer surfaces, defined by the broken lines 26 and 27, respectively, of Fig. 1, and illuminates an annular area of the instrument face, defined between the concentric, circular broken lines 28 and 29 of Fig. 2. By reason of the relatively small base angles at the inner and outer surfaces of the annular cone of light, any light reflected from the protective glass or from the instrument face is directed laterally to the side, as indicated by the broken lines 26' and 27' of Fig. 1, rather than back towards the viewer, to avoid the occurrence of glare which might interfere with viewing of the illuminated instrument face. Objectionable reflection off the protective glass may be further reduced by providing a fluoride coating on the latter. Further, the head 15 is positioned with respect to the instrument face so that the annular illuminated area included between circular lines 28 and 29 (Fig. 2) encompasses the important portions of the instrument face, for example, the part of the face having the scale or calibrations 30 thereon and the indicating end of the pointer or hand, while the shadow cast by base 20, and defined at its outer edge by circular line 28, falls upon an unimportant portion of the instrument face. Thus, the instrument face is illuminated only at those portions which need to be viewed and the remainder of the face is in shadow to avoid the scattering of light and glare, so that a relatively low intensity of illumination will be sufficient to render the illuminated portions of the face clearly visible by reason of the localized character of the illumination. The possibility of employing low intensity illumination is particularly desirable in aircraft and automobiles where glaring or high intensity illumination of the instruments interferes with night vision during night-time operations.

The illuminating head 15 is supported in front of the instrument face by structure which interposes a minimum of interference to viewing of the instrument face. Preferably, as shown in the drawings, such support for the illuminating head 15 is provided by a slender arm 32 extending at one end from sleeve 16 and mounted at its other end on structure adjacent the instrument face, for example, on the panel 10, as in the illustrated embodiment, or on a flange or other projection (not shown) on the instrument casing 12. The slender arm 32 is preferably formed of a deformable or relatively soft metal so that it can be bent at will to avoid interference with viewing of important portions of the illuminated instrument face or to vary the position of head 15 so that the illumination is directed against a selected area of the face. If desired, the arm supporting head 15 can be made extensible, for example, by forming the support arm of longitudinally telescopic portions 32a and 32b, as in Fig. 5, so that the distance between the head 15 and the mounting for the support arm can be varied at will to provide further flexibility in the positioning of the illuminating head.

While the support arm 32 may be fixedly anchored at its mounted end remote from head 15, the arm 32 is preferably mounted for swinging in front of the panel 10 in the direction parallel to the latter for reasons hereinafter given in detail. Mounting structure permitting such swinging of arm 32 is illustrated in Fig. 1 and is generally identified by reference numeral 33. Mounting structure 33 includes an internally threaded coupling member 34 rotatably mounted on a flared end portion 35 of arm 32 and engageable threadably on a threaded socket 36 secured to the panel 10. A nut 37 is threaded into coupling 34 to adjustably limit the movement of the latter onto socket 36. The threaded engagement of coupling 34 with socket 36 provides means for varying the distance of head 15 from the instrument face in the direction normal to the latter, and rotation of arm 32 relative to the coupling nut 34 is releasably resisted either by the frictional engagement therebetween or by other releasable means (not shown).

Preferably, current is supplied to light bulb 18 in head 15 through the support arm 32 which is hollow to accommodate a "hot" lead or wire 38, while the arm 32 itself serves as a conductor to ground. As seen in Fig. 4, the sleeve 16 of head 15 is in electrical contact with the shell or base 25 of the light bulb 18 and is integral with arm 32, while the "hot" lead or wire 38 is connected to an insulated contact ring 39 disposed in head 15 for engagement by the end contact 40 of the light bulb. The arm 32 is electrically connected to the grounded panel 10 through the successively contacting flared end 35, coupling 34 and socket 36, while contacts are provided within the mounting 33 for electrically connecting the "hot" lead or wire 38 to an electric supply line 41 (Fig. 1). Such contacts include a fixed contact 42 connected to line 41 and mounted in socket 36 within a suitable insulating sleeve, and a movable contact 43 connected to lead 38 and axially movable in an insulating sleeve 44 carried by the flared end 35 of arm 32 to be urged against contact 42 under the influence of a spring 45. Thus, the contacts 42 and 43 maintain their engagement while permitting axial adjustment of coupling 34 relative to socket 35 and swinging of arm 32 relative to the panel.

When illuminating instruments in accordance with the present invention, the several instruments on the panel are preferably arranged in parallel and equally spaced apart horizontal and vertical rows, as shown on Fig. 3, and an illuminating device 14 is mounted at each intersection of the diagonals, indicated by the broken lines 46, passing through the centers of the instrument faces so that each of the swingably mounted devices 14 can be swung to illuminate desired portions of any of the adjacent faces, as indicated in broken lines at 14', or to position more than one of the illuminating devices over a particular instrument, as at A. When the instruments are adequately illuminated by the ambient or natural light available, the devices 14 can be disposed between instruments, as at B, to completely uncover the adjacent instrument faces. Further, the support arm 32, being deformable, can be bent, as at 14a, so that the arm extends across a relatively unimportant portion of the instrument face, while the extensible embodiment of the invention, indicated at 14b on Fig. 3, further facilitates illumination of portions of the instrument face which may be relatively far from the mounting structure 33.

While the illuminating devices 14 are preferably swingable for the purposes detailed above, as previously mentioned the arms supporting the illuminating heads 15 may be fixedly mounted on the panel, and more than one arm or branched arms can support each head as shown in the lower portion of Fig. 3, but such an arrangement sacrifices the great flexibility provided by the swingable arm arrangement. Since the arms supporting the illuminating heads 15 in all embodiments of the invention are slender, it is apparent that such arms, even when they are fixedly mounted on the panel, will not cover much of the instrument face and it is apparent that the fixed arms can be disposed to avoid interference with any important portions of the instrument faces over which they extend.

The illuminating devices embodying the present invention have the advantage of being capable of installation on existing, non-illuminated instrument assemblies, without requiring any alteration of the sealed instrument casings. It is to be understood, of course, that the illuminating devices embodying the invention may also be installed on instrument assemblies which are particularly designed for illumination by such means. In either case, the devices serve to provide illumination at the essential areas of the instrument faces, and are adjustable so as to avoid interference with viewing of any essential areas of the illuminated instrument faces. Since several of the illuminating devices may be concentrated upon an individual instrument face, as shown in Fig. 3, an instrument installation embodying devices constructed in accordance with this invention permits the observer to concentrate more or less light upon the instruments as circumstances or personal preference of the viewer may require.

While particular embodiments of the invention have been described in detail, and illustrated in the accompanying drawings, it is to be understood that the invention is not limited to these precise embodiments, and that various changes and modifications may be effected therein without departing from the scope or spirit of the invention as defined in the appended claims.

What is claimed is:

1. An illuminating device for illuminating the face of an instrument; said device comprising a cylindrical shell closed at one end, means for mounting said shell in front of an unimportant portion of the face to be illuminated with the axis of said shell extending normal to the face and with the closed end of the shell directed away from the face, a transparent cylinder telescoping into said shell, an opaque base on said transparent cylinder and extending radially beyond the latter, the confronting annular edges of said base and shell being inclined in the direction away from the closed end of said shell to define an annular slit around said transparent cylinder, and a light source in said shell emitting an annular cone of light through said slit to fall upon an annular area of the instrument face around the shadow cast by said base, said transparent cylinder being adjustable axially with respect to said shell to vary the axial distance between said confronting edges of said shell and base and thereby to vary the thickness of said slit and, correspondingly, the angle of said cone of light as well as the thickness of the latter.

2. An illuminating device according to claim 1; wherein the radially inward portion of said edge of the shell confronting the edge of said base is concave and has a high gloss to act as a reflector directing the light emitted from said source toward the instrument face, and the remainder of said confronting edges have non-reflecting coatings thereon to prevent reflection of light thereoff in the direction away from the instrument face.

3. In combination with an instrument panel having several adjacent openings therein for exposing the faces of related instruments mounted behind said panel; means for illuminating said instrument faces comprising at least one elongated and relatively thin support arm lying in a plane substantially parallel to the plane of said panel, means swingably mounting one end of said arm on said panel for swinging about an axis normal to said panel at a location between said openings and equi-distant to all of the latter so that said arm can be selectively extended in front of any selected one of said openings, and an illuminating head on the other end of said arm operative to direct light toward said panel against the instrument face exposed at said selected opening.

4. In combination with an instrument panel having openings therein for exposing the faces of related instruments mounted behind said panel, said openings being arranged in parallel rows with the openings in each row being aligned with corresponding openings in adjacent rows; means for illuminating the instrument faces exposed at said openings comprising elongated and relatively thin support arms lying in a plane substantially parallel to the plane of said panel, means swingably mounting said support arms, at one end of the latter, on said panel at locations lying between said rows of openings and staggered with respect to the latter, said mounting means permitting swinging of the related arms in said plane parallel to the plane of the panel, and an illuminating head on the other end of each of said support arms operative to direct light toward said panel, each of said locations of the mounting means being equidistant from the adjacent openings in the adjacent rows of the latter so that the heads on more than one of said support arms can be arranged in front of a selected one of said openings to provide intense illumination of the instrument face exposed at said selected opening.

5. The combination as in claim 4; wherein each of said mounting means includes an internally threaded coupling member rotatably mounted on said one end of the related support arm, an externally threaded socket secured to said panel and having said coupling member screwed thereon so that rotation of said coupling member moves the related support arm and illuminating head toward and away from said panel, and a member threaded into said coupling member and engageable with said socket to act as an adjustable stop limiting the movement of said coupling member onto said socket.

6. The combination as in claim 4; wherein each of said illuminating heads includes a cylindrical shell having its axis normal to said plane of the panel and closed at the end thereof facing away from the panel, a transparent cylinder telescoping into said shell, an opaque base on said cylinder and extending radially beyond the latter, the confronting annular edges of said base and shell being inclined in the direction away from the closed end of the shell to define an annular slit around said transparent cylinder, and a light source in said shell emitting an annular cone of light through said slit, said transparent cylinder being adjustable axially with respect to said shell to vary the axial distance between said confronting edges of said shell and base and thereby to vary the thickness of said slit and, correspondingly, the angle and thickness of said cone of light.

7. A device for illuminating the face of an instrument mounted behind a panel opening; said device comprising an elongated, slender support arm having an end portion, at one end, extending substantially at right angles to the longitudinal axis of said arm, a coupling member rotatable on said end portion of the arm and being internally threaded, an externally threaded socket member adapted to be secured to the panel adjacent the opening of the latter and having said coupling member screwed thereon so that the support arm is then swingable about an axis normal to the plane of the panel and is movable toward and away from the latter in response to turning of said coupling member relative to said socket member, a member screwed into said coupling member and engageable with said socket member to act as an adjustable stop limiting the movement of said coupling member onto said socket member, and an illuminating head at the other end of said support arm for positioning in front of a panel opening, said head having a light source therein and an annular slit extending around the latter and inclined in the direction toward the panel to emit an annular cone of light directed against an instrument face exposed at the panel opening.

8. A device as in claim 7; wherein said head includes a cylindrical shell having its axis parallel to the swinging axis of said arm and a closed end facing in the direction away from the panel, a transparent cylinder telescoping into said shell, an opaque base on said cylinder extending radially beyond the latter, the confronting annular edges of said base and shell being inclined in the direction away from said closed end of the shell and defining said annular slit, said transparent cylinder extending around said light source and being adjustable axially with respect to said shell to vary the axial distance between said confronting edges and thereby to vary the thickness of said slit and, correspondingly, the thickness and angle of said cone of light.

References Cited in the file of this patent

UNITED STATES PATENTS

| | | |
|---|---|---|
| 666,381 | Gareau | Jan. 22, 1901 |
| 1,234,607 | Berkowitz | July 24, 1917 |
| 1,415,453 | Karle | May 9, 1922 |
| 1,644,231 | Bosworth | Oct. 4, 1927 |
| 1,793,457 | Adams | Feb. 24, 1931 |
| 2,247,409 | Roper | July 1, 1941 |
| 2,428,649 | Brown | Oct. 7, 1947 |

FOREIGN PATENTS

| | | |
|---|---|---|
| 569,873 | Germany | 1933 |